US011335321B2

(12) United States Patent
Jia et al.

(10) Patent No.: US 11,335,321 B2
(45) Date of Patent: May 17, 2022

(54) BUILDING A TEXT-TO-SPEECH SYSTEM FROM A SMALL AMOUNT OF SPEECH DATA

(71) Applicant: Google LLC, Mountain View, CA (US)

(72) Inventors: Ye Jia, Santa Clara, CA (US); Byungha Chun, Tokyo (JP); Yusuke Oda, Mountain View, CA (US); Norman Casagrande, Mountain View, CA (US); Tejas Iyer, Mountain View, CA (US); Fan Luo, Mountain View, CA (US); Russell John Wyatt Skerry-Ryan, Mountain View, CA (US); Jonathan Shen, Mountain View, CA (US); Yonghui Wu, Fremont, CA (US); Yu Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/005,974

(22) Filed: Aug. 28, 2020

(65) Prior Publication Data

US 2022/0068256 A1      Mar. 3, 2022

(51) Int. Cl.
G10L 13/08     (2013.01)
G10L 13/04     (2013.01)
(Continued)

(52) U.S. Cl.
CPC ............ G10L 13/04 (2013.01); G10L 13/033 (2013.01); G10L 13/086 (2013.01);
(Continued)

(58) Field of Classification Search
CPC ................................. G10L 13/00; G10L 13/04
See application file for complete search history.

(56) References Cited

U.S. PATENT DOCUMENTS 6,535,852 B2 * 3/2003 Eide .................... G10L 13/02
704/260
10,706,837 B1 * 7/2020 Chicote ................ G10L 13/033
(Continued)

FOREIGN PATENT DOCUMENTS

JP         2019120841 A      7/2019

OTHER PUBLICATIONS

Cross-Lingual, Multi-speaker Text-To-Speech Synthesis Using Neural Speaker Embedding, <https://pdfs.semanticscholar.org/2495/76bf32e54eadaba5ae9623615ec79386aecf.pdf> bf32e54eadaba5ae9623615ec79386aec <https://pdfs.semanticscholar.org/2495/76bf32e54eadaba5ae9623615ec79386aecf.pdf> f.pdf <https://pdfs.semanticscholar.org/2495/76bf32e54eadaba5ae9623615ec79386aecf.pdf>, East China Normal University, Ping An Technology, May 6, 2020.

(Continued)

*Primary Examiner* — Jakieda R Jackson
(74) *Attorney, Agent, or Firm* — Honigman LLP; Brett A. Krueger

(57) ABSTRACT

A method of building a text-to-speech (TTS) system from a small amount of speech data includes receiving a first plurality of recorded speech samples from an assortment of speakers and a second plurality of recorded speech samples from a target speaker where the assortment of speakers does not include the target speaker. The method further includes training a TTS model using the first plurality of recorded speech samples from the assortment of speakers. Here, the trained TTS model is configured to output synthetic speech as an audible representation of a text input. The method also includes re-training the trained TTS model using the second plurality of recorded speech samples from the target speaker combined with the first plurality of recorded speech samples from the assortment of speakers. Here, the re-trained TTS (Continued)

model is configured to output synthetic speech resembling speaking characteristics of the target speaker.

16 Claims, 5 Drawing Sheets

(51) Int. Cl.
    *G10L 13/033*     (2013.01)
    *G10L 15/06*     (2013.01)
(52) U.S. Cl.
    CPC .... *G10L 15/063* (2013.01); *G10L 2015/0635* (2013.01); *G10L 2015/0638* (2013.01)

(56) References Cited

U.S. PATENT DOCUMENTS

| | | | | |
|---|---|---|---|---|
| 2008/0195389 | A1* | 8/2008 | Zhang | G10L 17/24 704/246 |
| 2013/0030810 | A1* | 1/2013 | Kopparapu | G10L 15/06 704/260 |
| 2013/0226587 | A1* | 8/2013 | Cheung | G10L 15/25 704/273 |
| 2015/0112669 | A1* | 4/2015 | Fukuda | G10L 15/065 704/203 |
| 2016/0140951 | A1* | 5/2016 | Agiomyrgiannakis | G10L 13/02 704/260 |
| 2018/0333057 | A1* | 11/2018 | Chowdhary | A61B 5/6898 |
| 2019/0304470 | A1* | 10/2019 | Ghaemmaghami | G10L 21/0272 |
| 2019/0311708 | A1 | 10/2019 | Bengio et al. | |
| 2020/0027440 | A1* | 1/2020 | Kilgore | G10L 13/08 |
| 2020/0051583 | A1 | 2/2020 | Wu et al. | |
| 2020/0082806 | A1* | 3/2020 | Kim | G10L 15/26 |
| 2021/0089877 | A1* | 3/2021 | Shechtman | G10L 13/04 |
| 2021/0142148 | A1* | 5/2021 | Wang | G06K 9/6228 |
| 2021/0174783 | A1* | 6/2021 | Wieman | G10L 15/063 |
| 2021/0174806 | A1* | 6/2021 | Krishnaswamy | G10L 15/1822 |
| 2021/0183358 | A1* | 6/2021 | Mao | G10L 17/04 |
| 2021/0280196 | A1* | 9/2021 | Suzuki | G10L 17/00 |
| 2021/0304769 | A1* | 9/2021 | Ye | G10L 15/16 |

OTHER PUBLICATIONS

Location-relative Attention Mechanisms for Robust Long-form Speech Synthesis, <https://arxiv.org/pdf/1910.10288.pdf>, Google Research, Apr. 22, 2020.
Multi-speaker Modeling and Speaker Adaptation for Dnn-based TTS Synthesis, http://150.162.46.34:8080/icassp2015/p dfs/0004475. pdf, Microsoft Research Asia, May 6, 2020.

* cited by examiner

BUILDING A TEXT-TO-SPEECH SYSTEM FROM A SMALL AMOUNT OF SPEECH DATA

TECHNICAL FIELD

This disclosure relates to building a text-to-speech system from a small amount of speech data.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models were capable of providing intelligible speech, recent advances in neural modeling of speech have significantly improved the naturalness and fidelity of synthesized speech. Yet even with these advances, often times the accuracy and/or robustness of these neural network models depends on the corpus of training examples that are available to teach the neural network model how to synthesize speech. As such, when a limited amount of training examples exist, neural network models lack the speech synthesis accuracy and/or robustness that users of speech synthesis systems expect or even demand. This may be especially true as speech synthesis systems (e.g., personal assistants) become more integrated in daily human-computer interaction.

SUMMARY

One aspect of the disclosure provides a method of building a text-to-speech system from a small amount of speech data. The method includes receiving, at data processing hardware, a first plurality of recorded speech samples from an assortment of speakers and a second plurality of recorded speech samples from a target speaker where the assortment of speakers does not include the target speaker. The method further includes training, at the data processing hardware, a text-to-speech (TTS) model using the first plurality of recorded speech samples from the assortment of speakers. Here, the trained TTS model is configured to output synthetic speech as an audible representation of a text input. The method also includes re-training, by the data processing hardware, the trained TTS model using retraining speech data. The retraining speech data includes the second plurality of recorded speech samples from the target speaker combined with the first plurality of recorded speech samples from the assortment of speakers. Here, the re-trained TTS model is configured to output synthetic speech resembling speaking characteristics of the target speaker.

Another aspect of the disclosure provides a TTS system with a personalized voice. The system includes data processing hardware and memory hardware in communication with the data processing hardware. The memory hardware stores instructions that when executed on the data processing hardware cause the data processing hardware to perform operations. The operations include receiving a first plurality of recorded speech samples from an assortment of speakers and a second plurality of recorded speech samples from a target speaker where the assortment of speakers does not include the target speaker. The operation also include training a text-to-speech (TTS) model using the first plurality of recorded speech samples from the assortment of speakers. Here, the trained TTS model is configured to output synthetic speech as an audible representation of a text input. The operations further include re-training the trained TTS model using retraining speech data. The retraining speech data includes the second plurality of recorded speech samples from the target speaker combined with the first plurality of recorded speech samples from the assortment of speakers. Here, the re-trained TTS model is configured to output synthetic speech resembling speaking characteristics of the target speaker.

Implementations of the disclosure may include one or more of the following optional features. In some implementations, the TTS model includes an encoder, a decoder, and an attention mechanism. In these implementations, retraining the trained TTS model using retraining speech data comprises retraining the decoder and the attention mechanism of the trained TTS model, but not retraining the encoder of the trained TTS model. The attention mechanism may be an additive attention mechanism, a location sensitive attention mechanism, or a dynamic convolution attention mechanism.

In some configurations, the second plurality of recorded speech samples from the target speaker corresponds to ten percent of the retraining speech data. In other configurations, the second plurality of recorded speech samples from the target speaker corresponds to between about ten percent to about fifty percent of the retraining speech data. In some implementations, the second plurality of recorded speech samples from the target speaker corresponds to less than fifty percent of the retraining speech data. In some examples, processing the first plurality of recorded speech samples of the assortment of speakers to have consistent loudness and an equal duration of leading silence and training silence.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
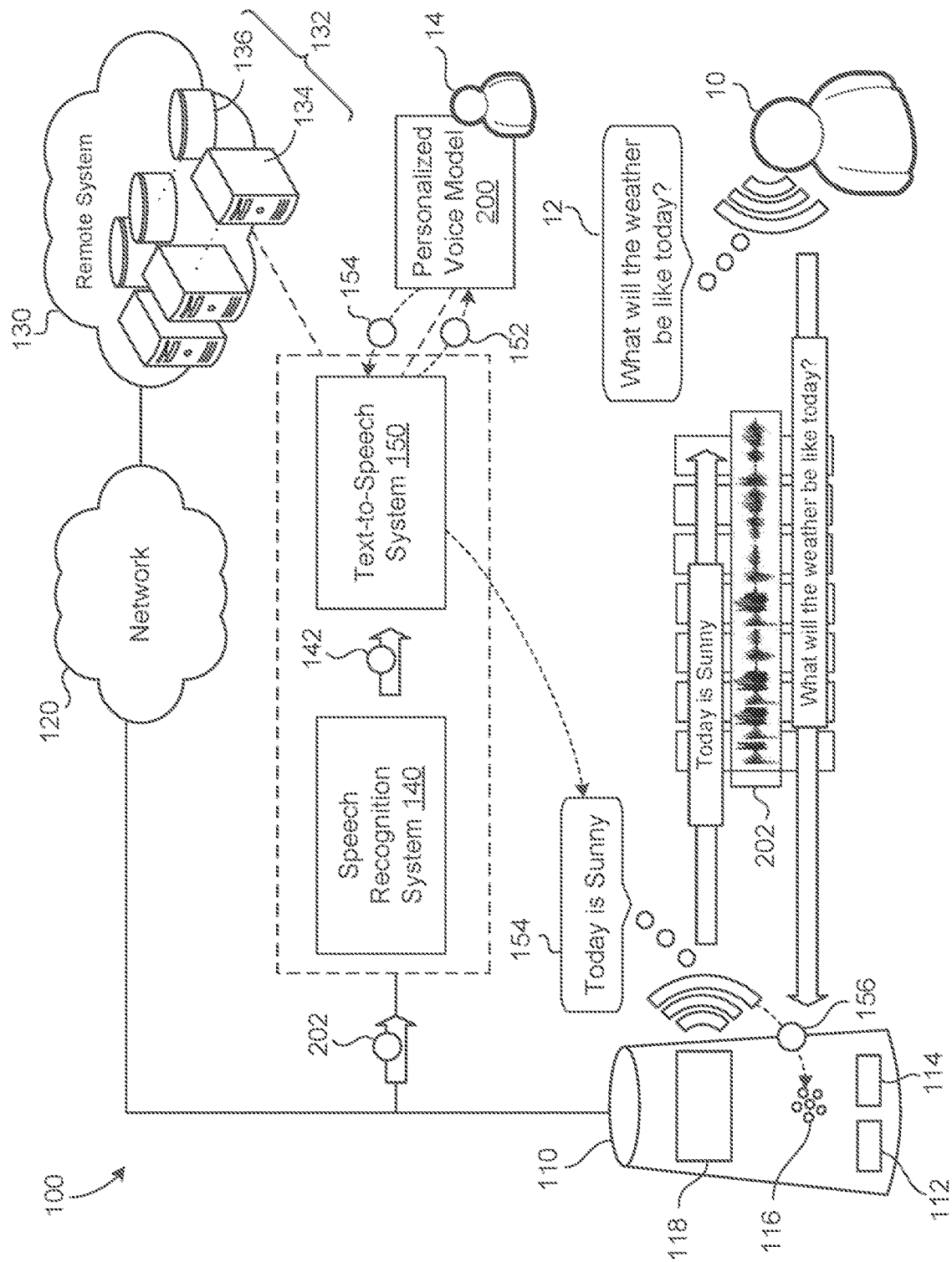
FIG. 1 is a schematic view of an example speech environment.

Deep neural networks have increasingly been used to advance an ability of a computing device to understand natural speech. Yet in addition to understanding natural speech, people often interact with computing devices with the expectation that the computing device (e.g., a speech-enabled device) generates synthesized speech as a response. For instance, a user of speech-enabled device submits a query to the speech-enabled device or a request that the speech-enabled device generates speech based on some form of text. In order to output a response to the user, the speech-enabled device employs a speech synthesis system or text-to-speech (TTS) system. Over time, speech synthesis has shifted from concatenative or statistical parametric synthesis to synthesis performed by deep neural network models. During this shift, speech synthesis or TTS systems have evolved to produce high-fidelity audio with near human parity.

Models that have proven to be a popular choice to generate seemingly realistic speech are attention-based sequence-to-sequence (seq2seq) models. Some of these neural end-to-end TTS models with attention mechanisms include Char2Wav (e.g., described in Sotelo, *Char2Wav: End-to-End Speech Synthesis*, available at https.//mila.quebec/wp-content/uploads/2017/02/end-end-speech.pdf), Deep Voice (e.g., described in Arik, *Deep Voice: Real-time Neural Text-to-Speech*, available at https://arxiv.org/pdf/1702.07825.pdf), Tacotron (e.g., described in Wang, *Tacotron: Towards End-to-End Speech Synthesis*, available at https://arxiv.org/pdf/1703.10135.pdf, and incorporated herein by reference), Tacotron 2 (e.g., described in Shen, *Natural TTS Synthesis by Conditioning WaveNet on Mel Spectrogram Predictions*, available at https://arxiv.org/pdf/1712.05884 pdf, and incorporated herein by reference), and WaveNet (e.g., a version of WaveNet described in van den Oord, *Parallel WaveNet: Fast High-Fidelity Speech Synthesis*, available at https.//arxiv.org/pdf/1711.10433 pdf, and incorporated herein by reference). These models have become popular choices for TTS models based on their ability to produce synthetic speech with high naturalness (e.g., each of listening, stylistic consistency, regional or language level nuances, etc.). Unfortunately, popular models like these rely on the highly flexible nature of attention mechanisms. Yet attention mechanisms may cause a model to occasionally suffer from serious synthesized speech errors such as babbling, early cut-off, failure to stop, long pauses, word repetition, or word skipping. Although these serious errors may rarely occur, with customer-facing products deploying these TTS systems, a serious error that occasionally occurs may severely impact a customer's experience with the product and/or the reputation of the product.

The robustness issues with attention-based mechanisms for TTS systems may become further exacerbated (e.g., perform poorly) when an amount of speech data for training a TTS model for TTS system is limited. In other words, models used in attention-based TTS systems require a large amount of recorded speech data to produce high quality neural networks. For instance, a single-speaker version of WaveNet has been shown to require about twenty-four hours of recorded speech to result in a high fidelity network for its TTS system. Moreover, other neural vocoders, such as single-speaker Tacotron, have greater fidelity when trained on more utterances (e.g., twenty-five thousand utterances) than less utterances (e.g., fifteen thousand or even eight thousand utterances). Yet there are inevitable circumstances where a large amount of recorded speech data is not available. When the networks train using small amounts of recorded speech data, the synthesized output may contain artifacts, such as static noise, which become more prominent when fewer training samples of recorded speech area available.

To compound the reality that TTS systems trained on small amounts of speech data result in lower quality neural networks and likely a lower quality output of synthesized speech, there is a demand for TTS systems to output synthetic speech with personalized voices (i.e., a personalized TTS voice). For instance, a client of a TTS system may want the synthetic speech output by their TTS system to sound like a spokesperson of the client. To illustrate, a news application on a mobile phone may want synthetic speech generated by the application to sound like their renowned newscaster. In other words, the CBS television/radio network may be interested in their synthesized speech from a TTS system sounding like Walter Cronkite. Yet unfortunately, there may not be a large amount of recorded speech samples to compile a large training corpus for a particular target speaker in order to train a TTS system to output synthesized speech that intelligibly sounds like the target speaker. Simply put, there is unlikely to be hours and hours of recorded speech samples for a target speaker totaling, for example, twenty-five thousand utterances. Moreover, clients of a TTS system, although interested in a personalized TTS voice, may find it too burdensome to request that their target speaker record many hours of speech samples.

Since speech synthesis models do not always have the luxury of a large amount of recorded speech data, TTS systems have attempted to generate personalized TTS voices by fine-tuning a pre-trained base model. In other words, this conventional fine-tuning approach refers to the process of first training a base model of a ITS system using a large corpus of training data and then re-training the base model, which was trained on the large corpus of training data, with the limited amount of recorded speech data for the target speaker having the desired personalized TTS voice. However, this fine-tuning training process is prone to overfitting, especially for attention-based ITS models. Overfitting refers to the fact that the fine-tuned model (or retrained base model) will often poorly generalize input text that is out of the domain of the limited amount of recorded speech data used for fine-tuning. In other words, during fine-tuning, the pre-trained base model will be trained with a small amount of recorded speech samples (i.e., a low-data regime) with the target speaker's voice (e.g., thirty minutes of recorded speech samples) and input text corresponding to a textual representation of each recorded speech sample within that low-data regime. Due to using only a small amount of recorded speech samples during the fine-tuning process, when the fine-tuned model receives an input text during inference (i.e., during run-time) that does not resemble a textual representation that was input as part of the fine-tuning process, the fine-tuned model is found to perform poorly. Here, to address these potential issues, the fine-tuning process is adapted to retrain the pre-trained base model using a training corpus of an adequate size to reduce overfitting that still results in a personalized TTS voice that intelligibly resembles the target speaker. With this approach, a TTS system may deploy a high fidelity attention-based TTS model to generate a personalized TTS voice.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Here, the device 110 captures an audio signal 202 (also referred to as audio data) of the spoken utterance 12 by the user 10. The device 110 may correspond to any computing device associated with the user 10 and capable of receiving audio signals 202. Some examples of user devices 110 include, but are not limited to, mobile devices (e.g., mobile phones, tablets, laptops, etc.), computers, wearable devices (e.g., smart watches), smart appliances, and internet of things (IoT) devices, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. In some examples, the device 110 includes one or more applications (i.e., software applications) where each application may utilize one or more speech processing systems 140, 150, 200 associated with device 110 to perform various functions within the application. For instance, the device 110 includes an assistant application configured to communicate synthesized playback audio 154 (also referred to as synthesized speech 154) to the user 10 to assist the user 10 with various tasks.

The device 110 further includes an audio subsystem with an audio capturing device (e.g., a microphone) 116 for capturing and converting spoken utterances 12 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 and/or conversion of text to speech using a TTS system 150 (e.g., using the self-training model 200). These systems 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local or remote in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

A speech recognition system 140 receives an audio signal 202 as an input and transcribes that audio signal into a transcription 142 as an output. Generally speaking, by converting the audio signal 202 into a transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio signal corresponding to the question "what will the weather be like today" to the speech recognition system 140. The speech recognized system 140 converts the audio signal into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 where the synthesized playback audio 154 is an audio signal defining an audible rendition of the text 152. Here, the TTS system 150 (or other speech synthesis system) includes a personalized voice model 200 (e.g., the personalized voice model of FIG. 2) that utilizes a deep neural network (e.g., an attention-based Tacotron network) to generate the synthesized playback audio 154. Once generated, the TTS system 150 communicates the synthesized playback audio 154 to the device 110 to allow the device 110 to output the synthesized playback audio 154. For instance, the device 110 outputs the synthesized playback audio 154 of "today is sunny" at a speaker 118 of the device 110. Here, when using the personalize voice model 200, the synthesized playback audio 154 output by the TTS system 150 is configured to resemble a target speaker 14. In other words, the personalized model 200 is configured to simulate the voice (e.g., in terms of naturalness and similarity) of the target speaker 14 when outputting synthesized playback audio 154. Although FIG. 1 depicts an example of a ITS system 150 in the context of an assistant application, the TTS system 150 (e.g., using the self-training model 200) is applicable in other text-to-speech scenarios, such as, for example, navigation or reading documents.

Figure 2:
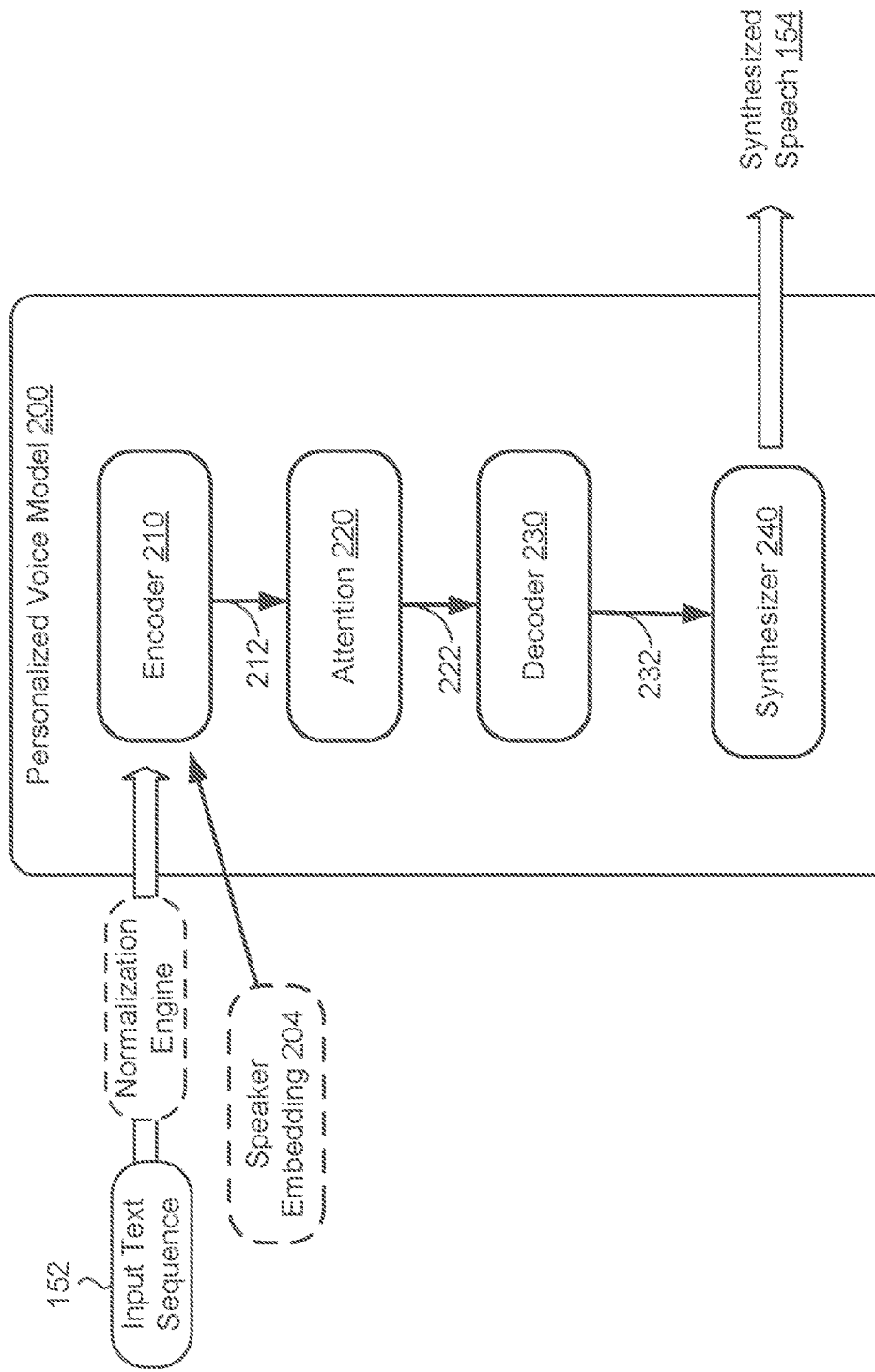
FIG. 2 is a schematic view of an example personalized speech model for a speech synthesis system of the speech environment of FIG. 1.

In some examples, such as FIG. 2, the personalized voice model 200 includes an encoder 210, an attention mechanism 220, a decoder 230, and a synthesizer 240. In some implementations, the encoder 210, the attention module 220, and the decoder 230 may collectively correspond to the seq2seq recurrent neural network (e.g., Tacotron or Tacotron 2) and the synthesizer 240 may be a neural vocoder (e.g., a WaveRNN-based neural vocoder). The encoder 210 is configured to receive the text input 152 (e.g., in the form of characters or phonemes) and to generate an encoded representation 212 of the text input 152. In some configurations, the text input 152 is first converted into a phoneme sequence (e.g., via a normalization engine) prior to being input into the encoder 210. In some implementations, the model 200 concatenates a speaker embedding vector 204 with the encoded representation 212 from the encoder 210 at each time step and passes this concatenation to the attention mechanism 220.

The attention mechanism 220 is configured to receive the encoded representation 212 as a sequence from the encoder 210 and to summarize the encoded representation 212 as a fixed-length context vector 222 for each decoder output step. The architecture of the attention mechanism 220 may vary depending on the particular TTS system 150. In some examples, such as when the model 200 corresponds to Tacotron, the attention mechanism 220 is an additive attention mechanism. In other examples, such as when the model 200 corresponds to Tacotron 2, the attention mechanism 220 is a location sensitive attention mechanism. In yet other implementations, the attention mechanism 220 may be a Gaussian Mixture Model (GMM) attention mechanism (e.g., to improve generalization to long utterances), a forward attention mechanism, a stepwise monotonic attention mechanism, or a dynamic convolution attention mechanism. With an attention mechanism 220, the model 200 may be able to generate an output sequence (e.g., a sequence of output log-mel spectrogram frames) based on additional inputs, such as the speaker embedding 204, that receive particular attention weights in order to generate the context vector 222.

The decoder 230 is configured as a neural network (e.g., an autoregressive recurrent neural network) to generate an output audio signal 232 (e.g., an output sequence mel-frequency spectrograms) of expressive speech that includes the intended prosody and speaker characteristics associated with the voice of the target speaker 14. For instance, based on the context vector 222, the decoder 230 predicts a representation of a speech signal (e.g., a mel frame or spectrogram frame) from the encoded representation 212. In some examples, the decoder 230 includes an architecture similar to Tacotron or Tacotron 2 (See "Tacotron: Towards End-to-End Speech Synthesis," by Y. Wang, et al., available at, e.g., https://arxiv.org/pdf/1703.10135.pdf and "Natural TTS Synthesis by Conditioning WaveNet on Mel Spectrogram Predictions," by J. Shen, et al., at, e.g., https://arxiv.org/abs/1712.05884) In other words, the decoder 230 may include an architecture having a pre-net, a Long Short-Term Memory (LSTM) subnetwork, a linear projection, and a convolutional post-net.

In some examples, the model 200 uses a "stop token" prediction during inference to allow the model 200 to dynamically determine when to terminate generation instead of always generating for a fixed duration. In some examples, when the stop token indicates that generation has terminated (i.e., when the stop token probability exceeds a threshold value), the decoder 230 stops predicting the mel-frequency spectrograms as the output audio signal 232 and returns the mel-frequency spectrograms predicted up to that point as the output audio signal 232 of expressive speech. In other examples, rather than depending on the output of the decoder 230, the stop token prediction is dependent on the output of the attention mechanism 220 (e.g., the context vector 222). In other words, the output audio signal prediction ends as soon as the attention of the attention mechanism 220 focuses on an end-of-sentence token in an input token sequence.

In some implementations, the speech synthesizer 240 is a Griffin-Lim synthesizer. In some other implementations, the speech synthesizer 240 includes a vocoder. For instance, the speech synthesizer 240 may include a WaveRNN vocoder. Here, the WaveRNN vocoder may generate 16-bit signals sampled at 24 kHz conditioned on spectrograms predicted by the TTS model 200. In some other implementations, the waveform synthesizer is a trainable spectrogram to waveform inverter. After the waveform synthesizer 240 generates the waveform, an audio subsystem can generate the synthesized speech 154 using a waveform and provide the synthesized speech 154 for playback (e.g., on the device 110), or provide the generated waveform to another system to allow the other system to generate and play back the synthesized speech 154. Generally speaking, the synthesizer 240 has little to no impact on resulting prosody and/or style of the synthesized speech 154, and in practice, only impacts audio fidelity of the synthesized speech 154 as the synthesizer 240 converts a representation of a speech signal (e.g., a mel frame or spectrogram frame output by the decoder 230) into a waveform.

Figure 3:
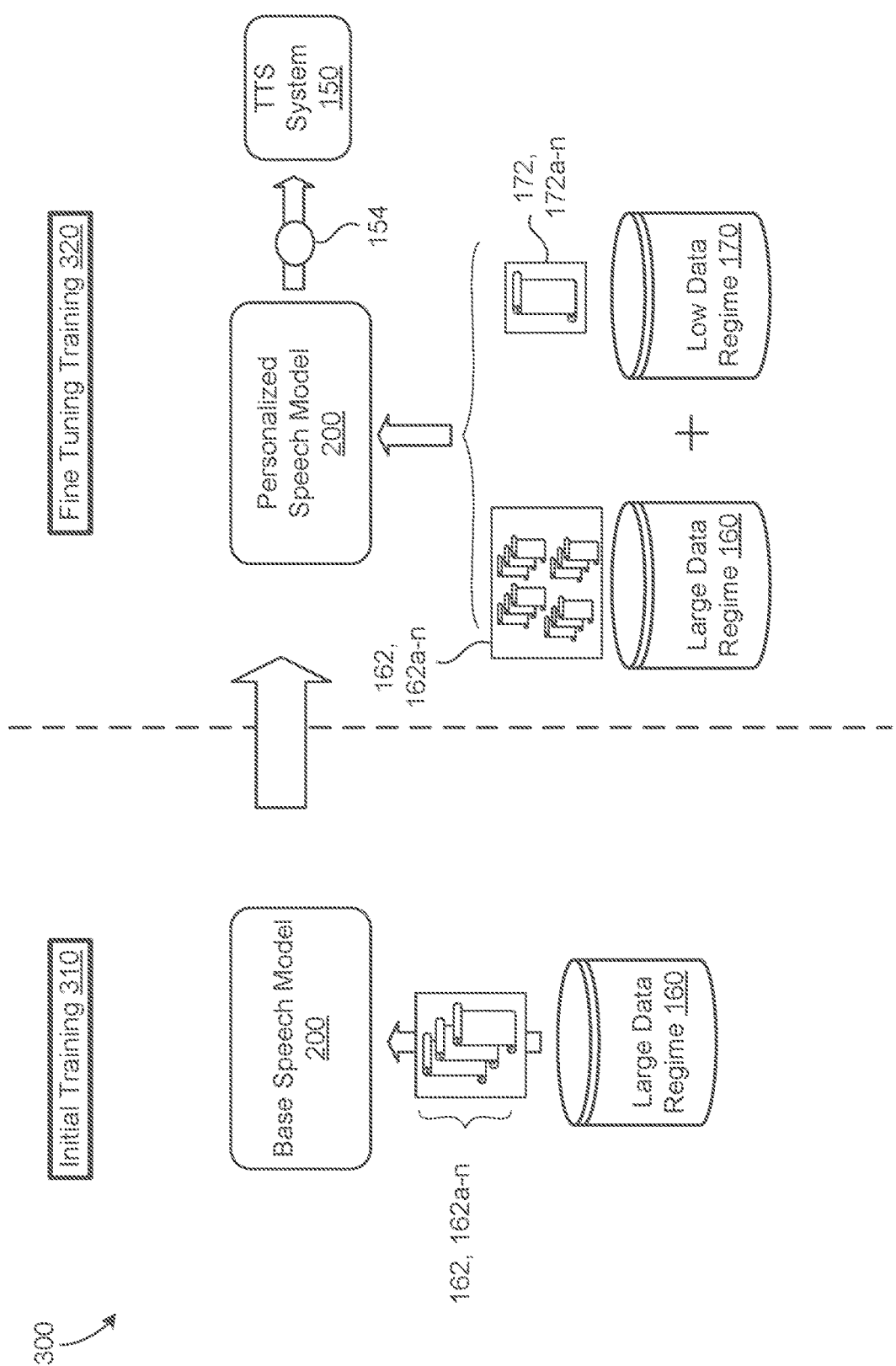
FIG. 3 is a schematic view of an example training process for training the personalized speech model for the speech synthesis system of the speech environment of FIG. 1.

Referring to FIG. 3, the TTS model 200 is configured to generate synthesized speech 154 with speaking characteristics of the target speaker 14. In other words, the synthesized speech 154 has characteristics (e.g., prosody such as intonation, tone, stress, rhythm, etc.) similar to or matching linguistic elements of spoken utterances from the target speaker 14. By modeling the speech of the target speaker 14, the personalized speech model 200 is able to generate synthesized speech with high naturalness and speaker similarity to the target speaker 14 (i.e., someone hearing the synthesized speech 154 associates the synthesized speech 154 with the particular target speaker 14). In order to form the personalized speech model 200 specific to the target speaker 14, the personalized speech model 200 undergoes a training process 300 divided into two stages, an initial training stage 310 and a fine tuning training stage 320. In the initial training stage 310, the training process 300 trains, or adapts, the model 200 into what was previously referred to as a pre-trained base model where the model 200 has been trained, but is not yet trained to generate synthesized speech 154 resembling speech of the target speaker 14. Here, FIG. 3 refers to the model 200 in the initial training stage 310 as the base speech model 200 to represent that, at this stage 310, the model 200 has not yet been trained to generate synthesized speech 154 resembling speech of the target speaker 14. In the fine tuning stage 320, the training process 300 trains the pre-trained base model 200 (i.e., trained from the initial training stage 310) to generate synthesized speech 154 resembling speech of the target speaker 14. Here, the difference between these stages 310, 320 is the type of training data used to train the model 200 during these stages 310, 320. When training the model 200, the training data includes training examples where each training example includes a recorded speech sample and text corresponding to that recorded speech sample (e.g., a textual representation of the characters, words, or phrases spoken during the recorded speech sample) A recorded speech sample may be spoken utterances 12 by one or more respective speakers that have been recorded by an audio capturing device (e.g., the audio capturing device 116). With a textual representation of each recorded speech sample, each stage 310, 320 of the training process 300 trains the model 200 to generate an output of synthesized speech 154 that resembles the input training example Often, to train to this resemblance, the training process 300 uses an optimization approach such that the training process 300 trains to minimize a loss function (e.g., the loss function described in "Transfer Learning from Speaker Verification to Multi-speaker Text-to-Speech Synthesis," by Y. Jia, et al., available at, e.g., https://arxiv.org/pdf/1806.04558.pdf and hereby incorporated by reference).

During the initial training stage 310, the training process 300 trains the model 200 using a large data regime or, stated differently, a large training data corpus. By initially training the model 200 with a large amount of speech data, the model 200 is able to be more robust. Since often collecting a large amount of speech data from a single speaker may be tedious, the large data regime 160 includes a plurality of recorded speech samples 162, 162a-n from an assortment of speakers. In other words, this large training corpus includes speech data from multiple different speakers. When the recorded speech samples 162 for the large data regime 160 includes a multitude of samples from different sources, the recorded speech samples 162 may have inherent inconsistencies (e.g., different loudness or periods of silence (e.g., start and end)). In some implementations, to combat these inconsistencies, the training process 300 processes the recorded speech samples 162 of the large data regime 160 to ensure uniform properties for the recorded speech samples 162. The processing may include processing the recorded speech samples 162 for uniform loudness and/or for uniform duration of leading and training silences. With recorded speech compiled from many speakers, the large data regime 160 may total several hundred hours and/or be several factors larger than a low data regime 170 of recorded speech samples 172 from the target speaker 14. Although the large data regime 160 includes recorded speech from many different speakers, the large data regime 160 does not include recorded speech samples 172 from the target speaker 14 during the initial training 310.

Instead, once the initial training stage 310 trains the model 200 to a pre-trained model state, the fine tuning stage 320 retrains the pre-trained model resulting from the initial training stage 310. The retraining process (i.e., the fine tuning stage 320) may retrain the entire pre-trained model 200 or a portion of the pre-trained model 200. For instance, the retraining process does not retrain the encoder 210 of the model 200, but rather fixes the encoder 210 of the pre-trained model 200 while retraining the attention mechanism 220 and the decoder 230. In some configurations, a speaker embedding table associated with the model 200 is also retrained during the fine tuning stage 320. Here, the fine tuning stage 320 may not retrain the encoder 210 since the encoder 210 processes only the input sequence, which is a speaker independent task.

During the fine tuning stage 320, the fine tuning retraining differs from conventional fine tuning for other personalized speech models in that, instead of retraining solely on a small amount of recorded speech samples 172 from the target speaker 14, the fine tuning stage 320 retrains the pre-trained base model jointly on a combination of data from the target speaker 14 (i.e., the low data regime 170) and the complete set of training data for the training the model 200 during the initial training stage 310 (e.g., the large data regime 160). By including a larger volume of training data during the fine tuning stage, the training process 300 may reduce or potentially avoid overfitting to the target speaker 14 and generalizing the model 200 to input texts 152 beyond the fine tuning stage 320 training data. For instance, FIG. 3 depicts the pre-trained base model 200 from the initial training stage 310 being trained with recorded speech samples from both the large data regime 160 and the low data regime 170. In this example, the pre-trained base model 200 retrains using training data that includes a first plurality of recorded speech samples 162 from an assortment of speakers and a second plurality of recorded speech samples 172 from the target speaker 14. In these examples, the assortment of speakers for the first plurality of recorded speech samples 162, 162a-n does not include the target speaker 14 such that the target speaker 14 remains unseen during the initial training stage 310. In some configurations, the amount of recorded speech samples 172a-n in the low data regime 170 that correspond to recorded speech samples 172a-n from the target speaker 14 may be ten to fifty percent of the total amount of training data used during the fine tuning stage 320. For instance, the number of recorded speech samples 172 from the target speaker 14 is ten percent of the total amount of training data (i.e., the combination of the recorded speech samples 172 for the target speaker 14 and the recorded speech samples 162 for the assortment of speakers).

Figure 4:
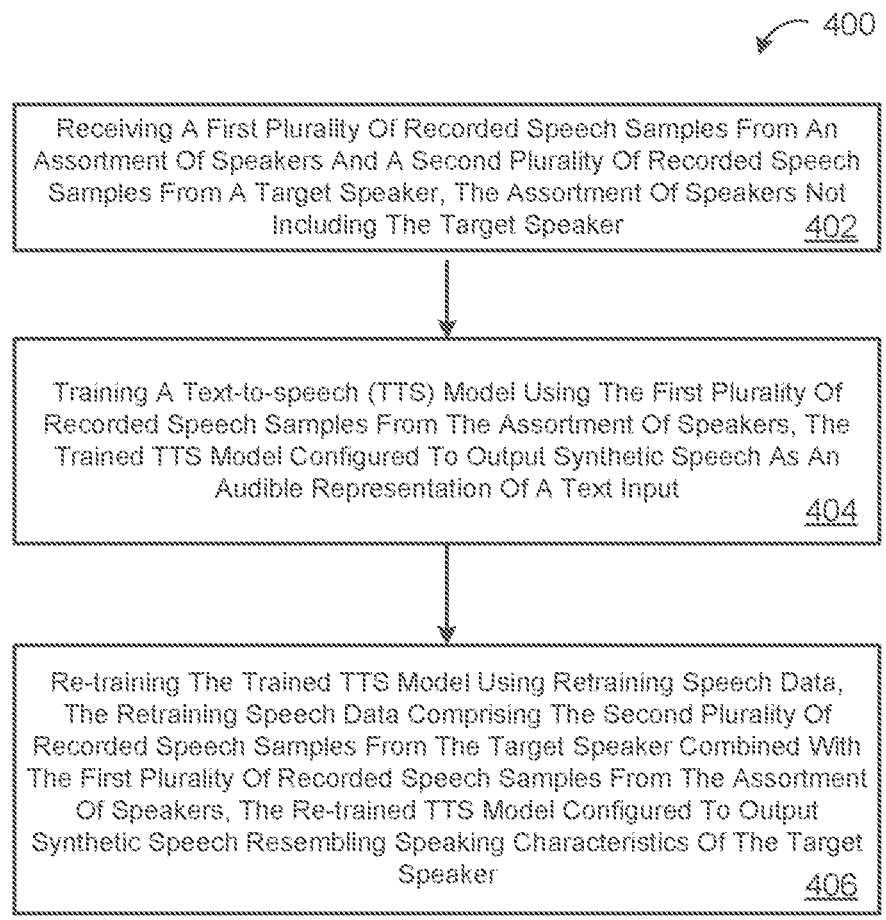
FIG. 4 is a flow chart of an example arrangement of operations for a method of building a speech synthesis system with a small amount of data.

FIG. 4 is a flowchart of an example arrangement of operations for a method 400 of building a TTS system 150 from a small amount of speech data. At operation 402, the method 400 receives a first plurality of recorded speech samples 162a-n from an assortment of speakers and a second plurality of recorded speech samples 172a-n from a target speaker 14. Here, the assortment of speakers does not include the target speaker 14. At operation 404, the method 400 trains a TTS model 200 using the first plurality of recorded speech samples 162a-n from the assortment of speakers. The trained TTS model 200 is configured to output synthetic speech 154 as an audible representation of a text input 152. At operation 406, the method 400 retrains the trained TTS model 200 using retraining speech data 162, 172 that includes the second plurality of recorded speech samples 172a-n combined with the first plurality of recorded speech samples 162a-n from the assortment of speakers. Here, the retrained TTS model 200 is configured to output synthetic speech 154 with speaking characteristics resembling the target speaker 14.

Figure 5:
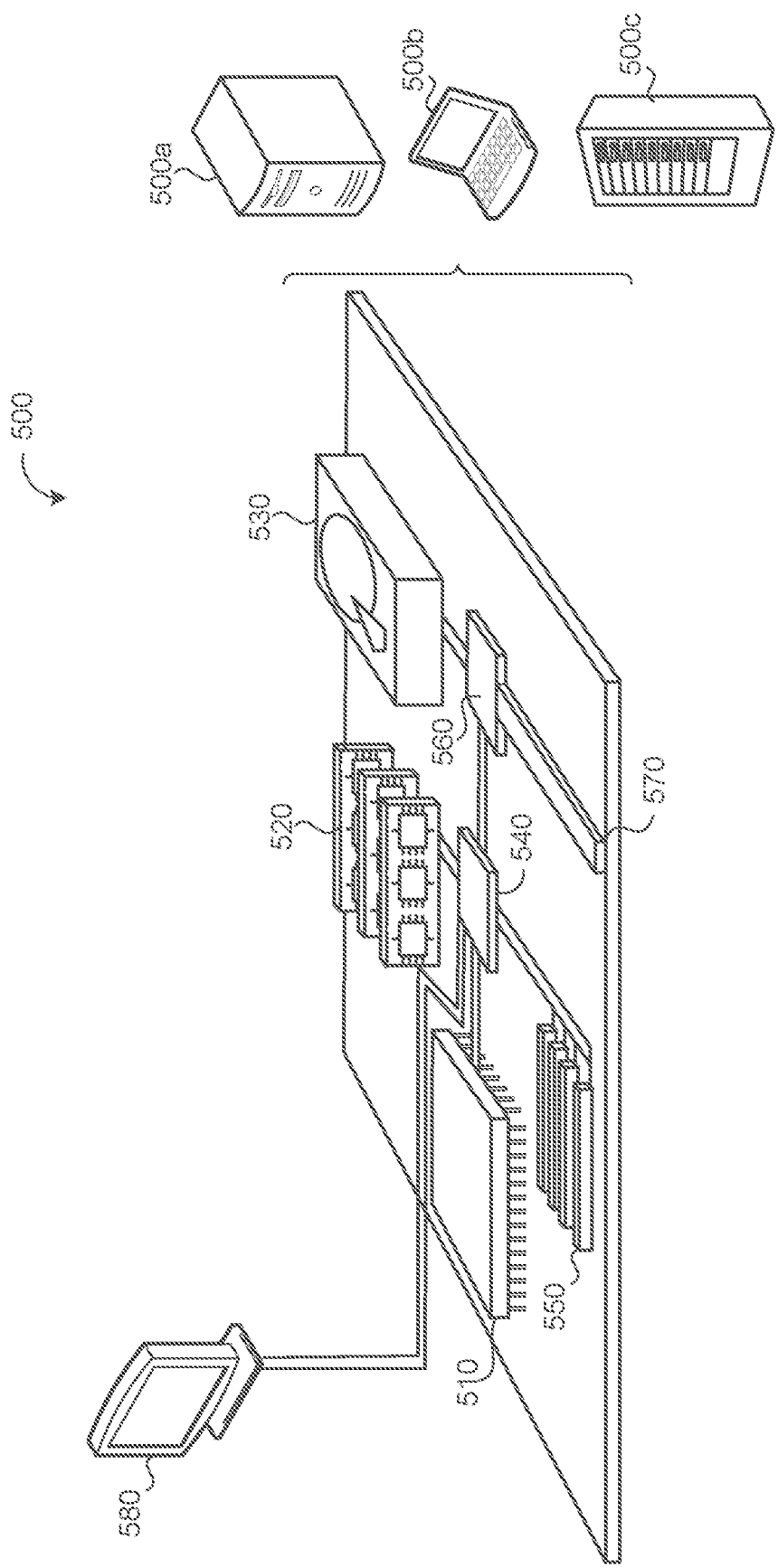
FIG. 5 is a schematic view of an example computing device that may be used to implement the systems and methods described herein.

FIG. 5 is schematic view of an example computing device 500 that may be used to implement the systems (e.g., systems 130, 140, 150, and model 200) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware 112, 134), memory 520 (e.g., memory hardware 114, 136), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, a first plurality of recorded speech samples from an assortment of speakers and a second plurality of recorded speech samples from a target speaker, the assortment of speakers not including the target speaker;
training, by the data processing hardware, a text-to-speech (TTS) model using the first plurality of recorded speech samples from the assortment of speakers, the trained TTS model configured to output synthetic speech as an audible representation of a text input; and
re-training, by the data processing hardware, the trained TTS model using retraining speech data, the retraining speech data comprising the second plurality of recorded speech samples from the target speaker combined with the first plurality of recorded speech samples from the assortment of speakers, the second plurality of recorded speech samples from the target speaker corresponds to less than fifty percent of the retraining speech data, the re-trained TTS model configured to output synthetic speech resembling speaking characteristics of the target speaker.

2. The method of claim 1, wherein the TTS model comprises an encoder, a decoder, and an attention mechanism.

3. The method of claim 2, wherein re-training the trained TTS model using retraining speech data comprises retraining the decoder and the attention mechanism of the trained TTS model, but not retraining the encoder of the trained TTS model.

4. The method of claim 2, wherein the TTS model comprises an additive attention mechanism.

5. The method of claim 2, wherein the TTS model comprises a location sensitive attention mechanism.

6. The method of claim 2, wherein the TTS model comprises a dynamic convolution attention mechanism.

7. The method of claim 1, wherein the second plurality of recorded speech samples from the target speaker corresponds to ten percent of the retraining speech data.

8. The method of claim 1, further comprising processing, by the data processing hardware, the first plurality of recorded speech samples of the assortment of speakers to have:
consistent loudness; and
an equal duration of leading silence and trailing silence.

9. A system comprising:
data processing hardware; and
memory hardware in communication with the data processing hardware, the memory hardware storing instructions that when executed on the data processing hardware cause the data processing hardware to perform operations comprising:
receiving a first plurality of recorded speech samples from an assortment of speakers and a second plurality of recorded speech samples from a target speaker, the assortment of speakers not including the target speaker;
training a text-to-speech (TTS) model using the first plurality of recorded speech samples from the assortment of speakers, the second plurality of recorded speech samples from the target speaker corresponds to less than fifty percent of the retraining speech data, the trained TTS model configured to output synthetic speech as an audible representation of a text input; and
re-training the trained TTS model using retraining speech data, the retraining speech data comprising the second plurality of recorded speech samples from the target speaker combined with the first plurality of recorded speech samples from the assortment of speakers, the re-trained TTS model configured to output synthetic speech resembling speaking characteristics of the target speaker.

10. The system of claim 9, wherein the TTS model comprises an encoder, a decoder, and an attention mechanism.

11. The system of claim 10, wherein re-training the trained TTS model using retraining speech data comprises retraining the decoder and the attention mechanism of the trained TTS model, but not retraining the encoder of the trained TTS model.

12. The system of claim 10, wherein the TTS model comprises an additive attention mechanism.

13. The system of claim 10, wherein the TTS model comprises a location sensitive attention mechanism.

14. The system of claim 10, wherein the TTS model comprises a dynamic convolution attention mechanism.

15. The system of claim 9, wherein the second plurality of recorded speech samples from the target speaker corresponds to ten percent of the retraining speech data.

16. The system of claim 9, further comprising processing, by the data processing hardware, the first plurality of recorded speech samples of the assortment of speakers to have:
consistent loudness; and
an equal duration of leading silence and trailing silence.

* * * * *